United States Patent [19]

Curtis

[11] Patent Number: 4,712,274
[45] Date of Patent: Dec. 15, 1987

[54] SAUSAGE STUFFER

[76] Inventor: David C. Curtis, 411 E. Waverly, Arlington Heights, Ill. 60004

[21] Appl. No.: 886,107

[22] Filed: Jul. 16, 1986

[51] Int. Cl.⁴ .................................. A22C 11/06
[52] U.S. Cl. .......................................... 17/39
[58] Field of Search .......................... 17/38, 39

[56] References Cited

U.S. PATENT DOCUMENTS

| | | | |
|---|---|---|---|
| 485,576 | 11/1892 | Eppler | 17/39 |
| 2,502,611 | 4/1950 | Weier | 17/39 |
| 2,914,796 | 12/1959 | Magnuson et al. | 17/39 |
| 4,376,327 | 3/1983 | Curtis | 17/39 |

Primary Examiner—Willie G. Abercrombie
Attorney, Agent, or Firm—Tilton, Fallon, Lungmus & Chestnut

[57] ABSTRACT

An elongated cylinder having a piston therein which is operable by water under pressure with means to control the water input and valving means in a header to control the sausage meat entering the stuffing tube.

12 Claims, 13 Drawing Figures

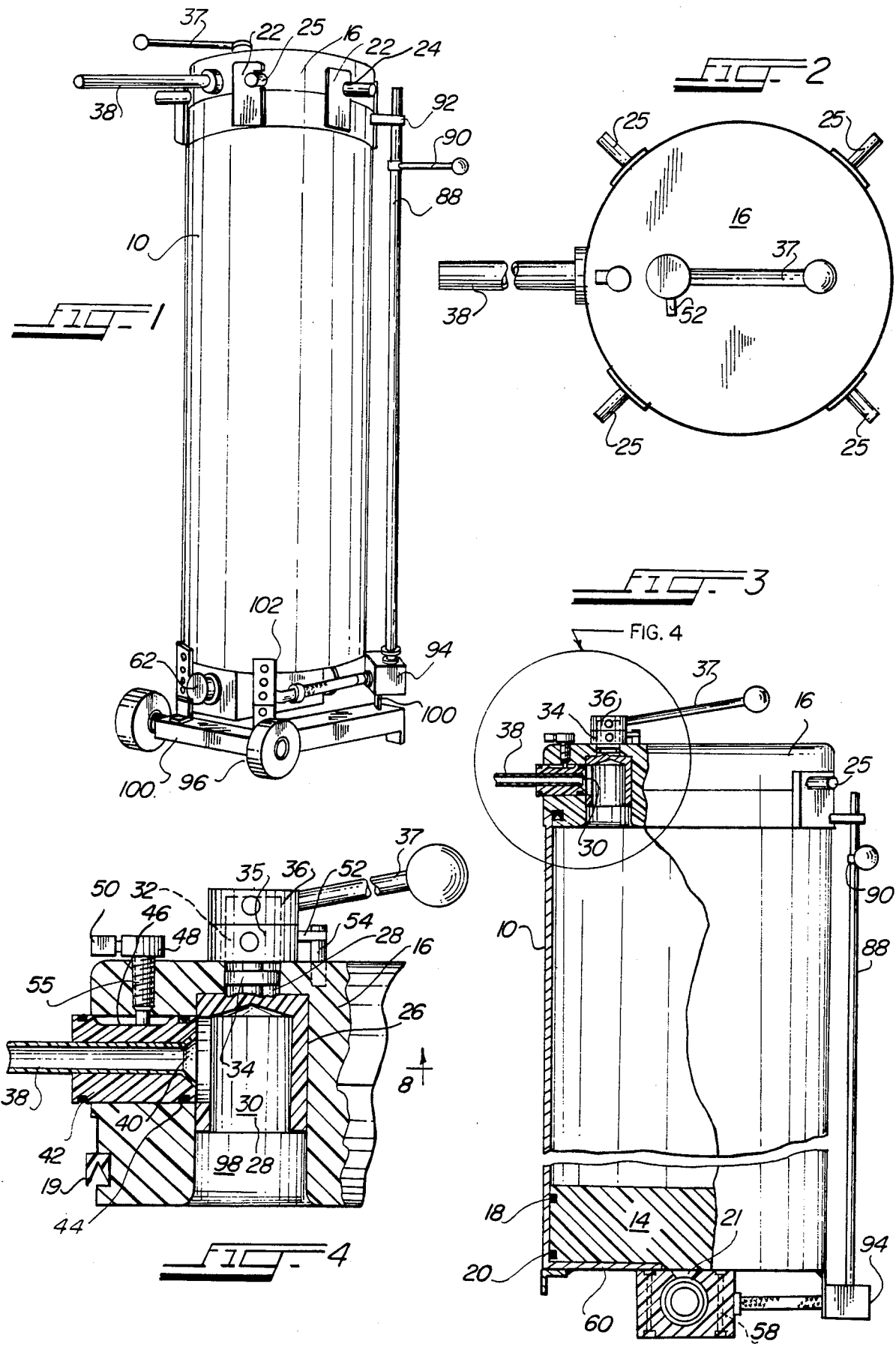

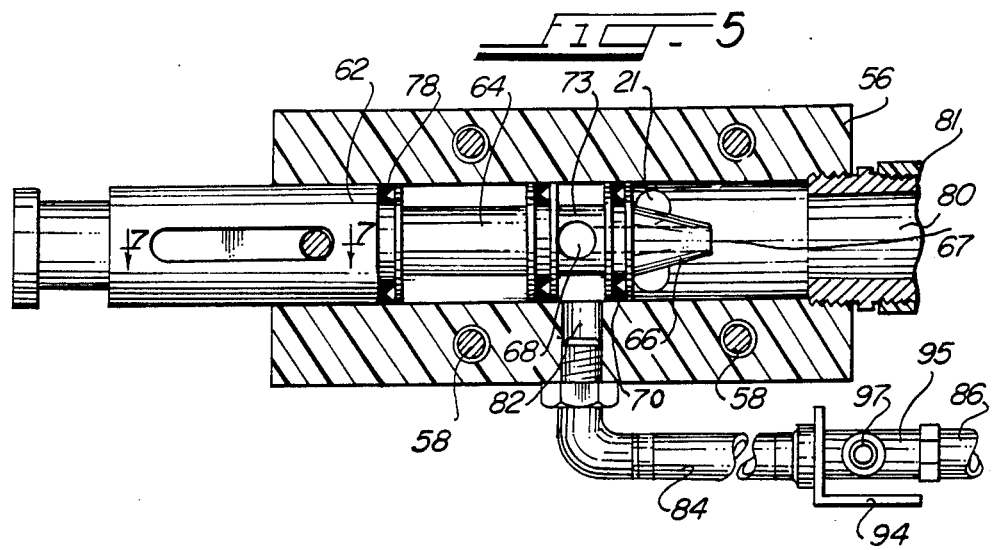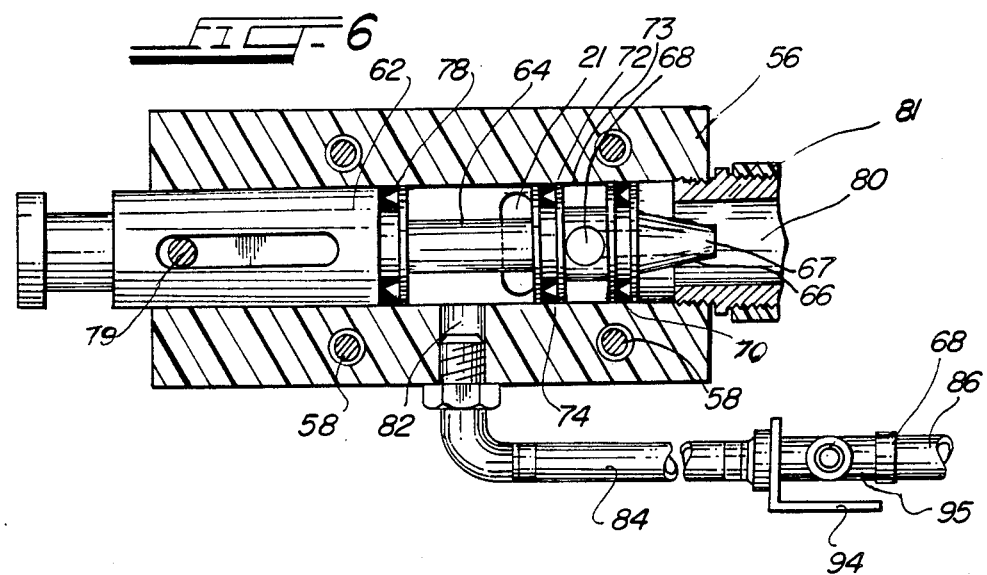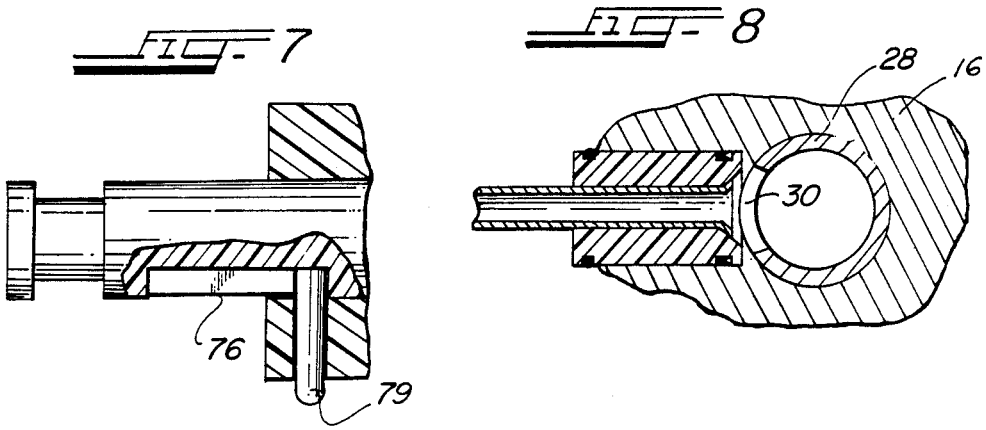

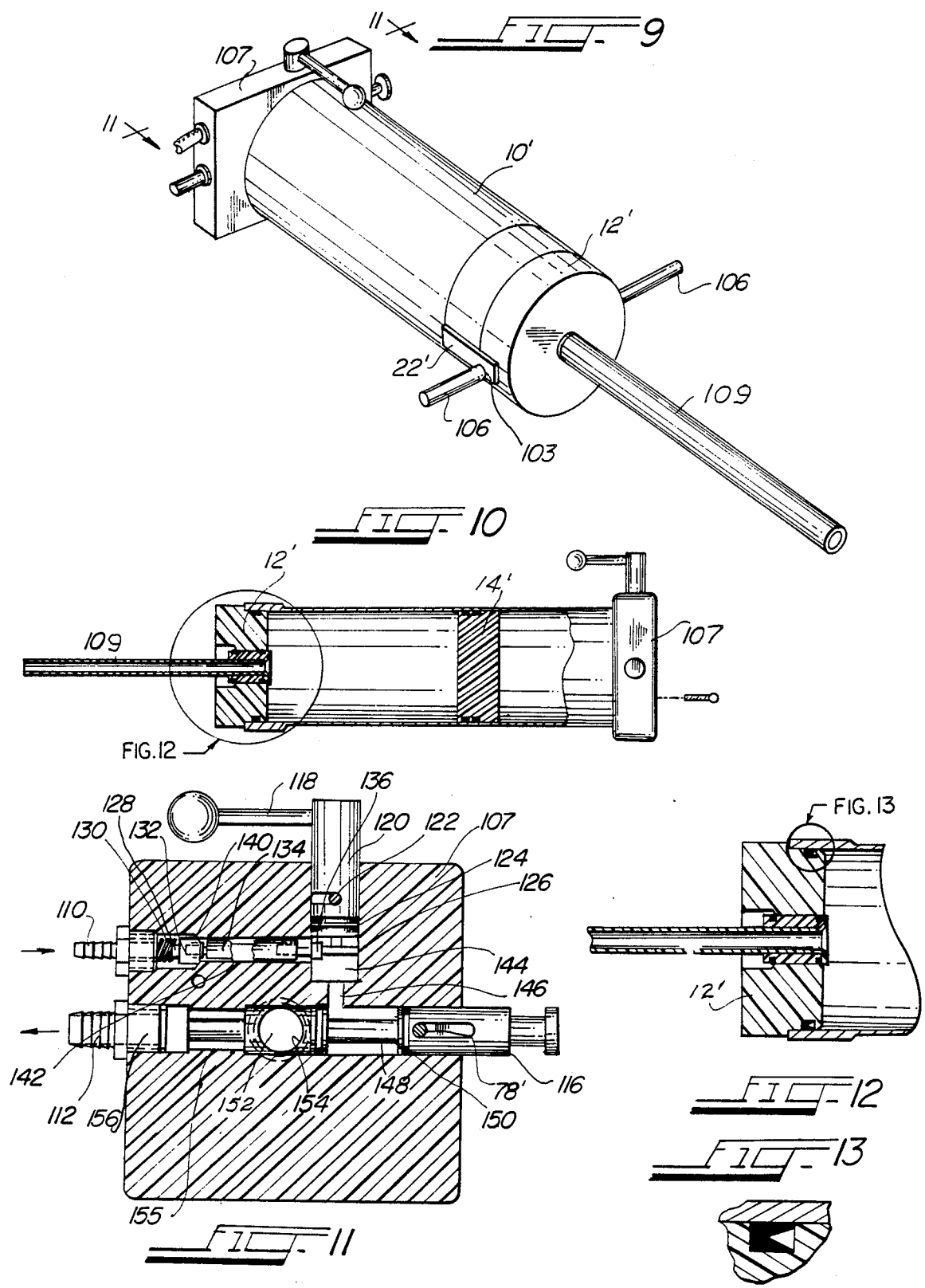

SAUSAGE STUFFER

BACKGROUND OF THE INVENTION

This is an improvement over my U.S. Pat. No. 4,376,327 issued Mar. 15, 1983, for a Water Powered Sausage Stuffer. It was to improve the foregoing invention that the instant invention was conceived.

SUMMARY OF THE INVENTION

An elongated sausage stuffer having an enlarged cylinder with one end opened and a floating piston therein for operation by water under pressure, a header for the cylinder having valving means to control the meat entering the skin through a stuffing tube and valving means to control the water entering the cylinder to force the piston to deliver the meat toward the header.

BRIEF DESCRIPTION OF THE DRAWINGS

FIG. 1 is a perspective view of the main embodiment of this invention;

FIG. 2 is a top elevational view of FIG. 1 illustrating the control for the meat entering the stuffing tube;

FIG. 3 is a side elevational view taken on the lines 3—3 of FIG. 2 with parts in cross-section;

FIG. 4 is an enlarged cross-sectional view taken in the circle of FIG. 3;

FIG. 5 is an enlarged cross-sectional view of the water valve in open position;

FIG. 6 is an enlarged cross-sectional top view of the water valve in closed position;

FIG. 7 is a partial cross-sectional view taken on the lines 7—7 of FIG. 5;

FIG. 8 is a cross-sectional view of the header meat valve;

FIG. 9 is a perspective view of a modification of the present invention;

FIG. 10 is a side elevational view taken on the circle of FIG. 12;

FIG. 11 is a side elevational view thereof with parts in cross-section;

FIG. 12 is a cross-sectional view of the details of the sausage stuffed tube and header; and FIG. 13 is an enlarged cross-sectional view illustrating the U-seal and taken on the circle of FIG. 12 illustrating the U-seals used substantially throughout the unit.

DETAILED DESCRIPTION OF THE DRAWINGS

An elongated stainless steel cylinder 10 has a free floating piston 14 and a header 16.

The piston 14 is cylindrical and usually constructed of plastic and may be provided with U-ring seals 18 and 20 adjacent the upper and lower edges thereof. (See FIG. 3.)

The cylinder is closed by the header 16 and at the lower end except for an opening 21.

A header 16 is anchored to the upper end of the cylinder. The cylinder is provided with three or more vertical plates 22 secured to the upper end thereof and each contains a short bayonet slot 24 to receive the short rods 25, respectively, to hold the header 16 in place on the cylinder.

The header is provided with a cylindrical opening 98 extending from the lower end of header 16 upward adjacent the upper surface where the opening is smaller in diameter than the opening as at 34. (See FIG. 4.) A rotary hollow cylindrical valve 28 is positioned in the opening 98 and provided with an aperture 30 in the side wall. The valve has a cylindrical upper section 32 positioned above the opening adjacent 26 with a U-seal 34 anchored therein. The collar 36 has a handle 37 anchored to its upper end for rotating the valve 28 to move aperture 30 into and out of position as will hereinafter be explained.

The collar 35 is also provided with a horizontally extending pin, or pins, 52 adapted to limit movement of valve 28 by abutting a vertically positioned stop pin 54 anchored in the header 16.

A horizontally positioned sausage stuffing tube 38 communicates with the valve 28, i.e., the opening 30 thereof. The tube 38 is flared at its inner end as at 40. The tube is positioned in a bushing 42 having a U-seal 44 adjacent its inner end. The inner end of the cylindrical bushing 42 is flared to seat the flared out end 40 of the tube 38. The bushing is also provided with an offset portion 46 in which the lower end of a lockscrew 55 having a large head 48 seats to limit the travel of the bushing 42. The head 48 of the lockscrew is provided with a capscrew 50 to lock it in place.

Thus, with the release of the lockscrew 55, the sausage stuffer tube and bushing can be pulled outwardly for cleaning the opening 30 and valve 28 and adjacent area without removing the header although the lower end of the header should be cleaned also. To clean the cylinder, the header must be removed by rotation.

The manually operated water valve is clearly seen in FIGS. 5, 6 and 7 and comprises a main plastic block 56 secured to the bottom of the cylinder by four elongated bolts 58. The threaded end of the bolt is anchored in a threaded aperture (not shown) to the bottom 60 of the cylinder 10. The block 56 is drilled out medially to receive the valve proper. The valve comprises an elongated cylindrical member 62 containing an offset 64, a forward conical end 66 which is axially bored at 67 extending from and communicating with a bore 68, and a number of seal seats, 70, 72 and 78. The valve member 62 also contains a cutaway portion 73 for the reception of the water from inlet 82. A water outlet 80 is connected adjacent the conical member 66 and communicates with the axial opening 67. A hose is connected at one end to the outlet 80 and the other end is associated with the drain in the floor or sink (not shown). The offset 64 communicates with the aperture 21 and the water inlet 82 through piping 84 and a water hose 86 connected to a faucet (not shown) or water supply. A water control rod 88 and handle 90 therefor extends from the upper end of the cylinder 10 to the water inlet and is spaced from the cylinder 10 by bracket 92. The lower end of rod 88 is connected to a stainless steel ball valve 95 and is spaced from the cylinder 10 by bracket 94 for controlling water entering the inlet 82, i.e., on or off.

In operation, the header 16 is removed and sausage meat placed therein with the header in place. The handle 37 is rotated to move the opening 30 in line with the tube 38 and the rod is rotated after the valve is manually pushed in (See FIG. 6.) to move the opening 21 in line with the offset 64 whereby the piston 14 will push the sausage meat upwardly out of the opening 30 and into the tube 38 which has a sausage skin placed thereon. When the sausage meat is used up, the water is turned off by rod 88 and valve 62 pulled out physically. Thus the water will drain out the opening 80 to discharge.

As seen in FIG. 5, the valve 62 is moved to the left and the water enters the offset 73 and the bore 67 and goes to the drain through hose 81, thus creating a partial vacuum on aperture 21 emptying cylinder 10 of water through drain hose 81. Note: It should be noted that the above mentioned will start the siphon effect and this unit will drain up into a sink, if the inlet water is left on for only 5 seconds, then shut off to fill the drain hose 81.

As seen in FIG. 6, the valve 62 has been manually shifted to the right and the water goes into the offset 64 and into the aperture 21 to move the piston 14 upwardly.

As seen in FIG. 3, the lower end of the header 16 partially seats in the cylinder 10 and the valve 28 is closed as well as the opening 30 in the header 16 so that when the piston 14 forces the meat upwardly, it will enter the valve 28 and be retained therein until the handle 37 is rotated to place the opening 30 in line with the tube 38.

This sausage stuffer is provided with a pair of wheels 96 whose axle and plate 100 are connected to the depending plates 102 by bolting for ready movement from one area to another. The hoses are secured to the inlet and outlet. The outlet hose is associated with the floor or sink drain while the inlet hose is connected to a source of water under pressure.

The modification shown in FIGS. 9 to 11 is a small unit which is arranged to lie horizontally on a table or sink top (not shown). The modification comprises a cylinder 10', a piston 14' and header 12'. The header 12' has a pair of opposed plastic arms 106 which seat in a bayonet slot 103, which arms 106 are secured to the outer side of the cylinder as in the main embodiment. The stuffing tube 109 extends horizontally through the header 12' axially thereof. The stuffing tube is constructed identically as in the preferred embodiment except it is longer. Also, the valve 28 is eliminated. However, the inlet and outlet for the water are entirely different. Here they project outwardly as at 110, 112.

The operating handle 116 to raise the piston 14' or to drain the water is hand operated by pushing the valve in to line up the aperture 146 or by pulling out as in FIG. 11 to drain the water from the cylinder through opening 152.

The water control is actually shown in FIG. 11 wherein the handle 118 is secured to a depending cylinder 120 which is provided with a limit pin 122, pairs of U-rings and a depending tube 124 to which a cam 126 is secured. The water inlet 110 is provided with a short rod 128 about which spring 130 is secured and includes a rubber Fuller ball 132 secured to the elongated tube 134 which abuts the cam 126 and is held thereagainst by the spring 130. All these parts are located in an enlarged opening. The spring 130 also controls the Fuller ball 132 as the cam 126 is rotated.

When the handle 118 is turned as in FIG. 9, this causes the cam to rotate and open the Fuller ball to allow water to flow from the inlet 110 through aperture 146 and into the opening 152 of cylinder 10' through the opening to the offset 148 to raise the piston.

To drain the cylinder, the unit must be stood on end 107 and the valve 116 pulled out against limit pin 78' to communicate with the opening 152 in the tube 155 where it will drain through tubes 155 to the outlet 112.

In order to insure the drain water flows through the opening 152, a U-ring 154 is positioned in its seat.

It is to be understood that numerous details may be altered or omitted without departing from the spirit of this invention as defined by the following claims.

I claim:

1. A vertically disposed, portable sausage stuffer apparatus, a housing comprising a cylinder open at one end, a piston in said cylinder movable by water pressure, means to control the action of the piston in said cylinder, a removable header for closing said open cylinder end, means to move the header, and a sausage stuffer tube positioned in said header and extending outwardly thereof, said cylinder having an open end and a closed bottom wall, spaced plates upwardly extending and secured to an upper end of said housing and extending beyond said open end for positioning said header, a plurality of depending, spaced legs secured to the lower end of said housing and having spaced apertures therein, wheels on a pair of said legs for portability, the other pair of legs being longer than the pair to which said wheels are attached to support the apparatus in vertical position.

2. The apparatus according to claim 1 wherein said header is provided with a bore in the lower end thereof communicating with said stuffer tube.

3. The apparatus according to claim 2 wherein said cylinder is provided with a bore in the lower end thereof, said cylinder communicating with said bore.

4. The apparatus according to claim 3 wherein a series of spaced, perforated angle irons are mounted to the bottom wall of said housing adjacent the outer edge thereof, bolts, said depending legs adjustably secured on said angle irons by said bolts.

5. The apparatus according to claim 4 wherein the means to control the action of said piston is a water valve, said valve having a housing secured to the bottom wall of said cylinder and having an aperture therein communicating with the aperture in said bottom wall, a second piston therein, offsets in said piston cooperating with said aperture in said cylinder, means to shift said piston, water under pressure supplied to said piston through said second piston for forcing said first mentioned piston upwardly and water discharge means on said second mentioned piston to lower said first named piston by gravity.

6. The apparatus according to claim 5 wherein a venturi outlet passage is provided in said second named piston to insure downward movement of said piston during water discharge and prevent any vacuum forming therein during discharge.

7. The apparatus according to claim 5 wherein the means to control the water valve ball is by hand operation through a handle and a rod to open and shut off the water.

8. The apparatus according to claim 1 wherein the first named piston and header are provided with U-rings therein to retain the water and sausage meat, respectively, below and above said first named piston.

9. The device according to claim 1 wherein the means to control the sausage meat is a vertical opening communicating with a horizontal bore in the header, a rotatable cylinder having an opening to control the sausage meat flowing therethrough, said stuffer tube mounted in the side of the header, U-seals on said cylinder to prevent the sausage meat from passing outside of said stuffer tube when closed, the inner end of said tube being flared to prevent withdrawal from its said cylinder and means to prevent said stuffer from disengaging from said cylinder.

10. The apparatus according to claim 5 wherein a rod is rotatably anchored to the outside of said first named cylinder to manually open and shut off said water.

11. A sausage stuffer comprising a vertically disposed cylinder open at one end, a piston in said cylinder operable by water pressure, a removable header to close said cylinder and fill said cylinder with sausage meat, a stuffer rod axially positioned at one end in said cylinder, a water valve having a side and end wall communicating with said cylinder and anchored to the lower end of said cylinder, said means for operating said water valve comprises a handle and a dependent rod rotatively mounted in said side wall and having a cam depending from said rod, a water valve inlet valve comprising an enlarged bore communicating with a small in diameter elongated bore, a Fuller ball seated in said enlarged bore, a spring urging said ball forward of said elongated bore, a hollow tube in said elongated bore having a headed pin secured to the downstream end which head abuts said cam whereby upon rotation of said handle the cam will rotate to force the tube rearwardly to unseat the Fuller ball and allow water to enter the hollow end of the handle cylinder to the opening in the bottom of the meat cylinder by pulling the valve out the opening in the bottom of the cylinder matching the hole in the tube and thence outwardly through the outlet opening.

12. The apparatus of claim 11 wherein said water valve is positioned in the end wall and the means for operating it is in the side wall.

* * * * *